(12) United States Patent
Campbell

(10) Patent No.: US 6,382,138 B1
(45) Date of Patent: May 7, 2002

(54) RELEASABLE HONDA

(76) Inventor: Raymond L. Campbell, 32772 W. 241st St., S. Bristow, OK (US) 74010

( * ) Notice: Subject to any disclaimer, the term of this patent is extended or adjusted under 35 U.S.C. 154(b) by 0 days.

(21) Appl. No.: 09/887,159

(22) Filed: Jun. 21, 2001

Related U.S. Application Data

(60) Provisional application No. 60/225,119, filed on Aug. 14, 2000.

(51) Int. Cl.$^7$ ............................................... A01K 37/00
(52) U.S. Cl. ..................... 119/712; 119/805; 119/110; 119/772; 119/153; 119/865; D8/396
(58) Field of Search ................................ 119/805, 110, 119/772, 153, 865; D8/396

(56) References Cited

U.S. PATENT DOCUMENTS

| | | | |
|---|---|---|---|
| 3,584,606 A | * 6/1971 | Riedhead | 119/153 |
| 3,629,908 A | * 12/1971 | Phillips | 24/115 |
| 3,716,031 A | * 2/1973 | Rowbury | 119/153 |
| D261,229 S | * 10/1981 | Dvorsky | D8/396 |
| 5,806,469 A | 9/1998 | Cooper-Ratliff et al. | 119/805 |

* cited by examiner

Primary Examiner—Charles T. Jordan
Assistant Examiner—Bethany L Griles
(74) Attorney, Agent, or Firm—Williiam R. Sharp

(57) ABSTRACT

A releasable honda for a lariat comprises: a heel which includes a proximal end, a distal end, and a throat having a longitudinal axis and extending along such axis between the proximal end and distal end, wherein the throat has at least a portion thereof adjacent to the proximal end that peripherally varies in radius so as to have at least three equiangularly spaced maximum radii and a corresponding number of equiangularly spaced minimum radii between the maximum radii, such maximum and minimum radii being substantially constant along the length of the throat portion; and a pair of resilient arms having respective distal ends and extending from the proximal end of the heel on opposite sides of the longitudinal axis to such distal ends, which are closely adjacent to or contacting one another so that the arms form an eye. A lariat incorporating the releasable honda includes a rope having a knotted end seated in the throat portion and extending through the throat and then through the eye so as to form a loop.

19 Claims, 2 Drawing Sheets

RELEASABLE HONDA

CROSS-REFERENCE TO RELATED APPLICATIONS

This application claims the benefit of U.S. Provisional Application No. 60/225,119, filed Aug. 14, 2000.

BACKGROUND OF THE INVENTION

The invention relates to a releasable honda for a lariat.

A lariat is conventionally formed by tying a honda at one end of a rope, which defines an eye, and passing the other end thorough the eye to form a loop such a lariat can be used to rope animals, particularly calves and steers. It is important for the roper to practice such roping to hone his or her skills. In practicing, however, the roper must remove the rope from the animal's neck for each practice throw. This of course takes time, and cuts down on the number of practice throws the roper can make in a given period of time. Also, young ropers practicing in this manner may find it difficult to release the animal by hand.

To overcome the inconvenience and difficulties in practicing with a conventional lariat having a tied honda, releasable or "breakaway" hondas have been developed which automatically release in response to a strong pulling force. The typical releasable honda comprises a body portion or "heel" having a throat for receiving a knotted end portion of a rope, and a pair of resilient arms extending from the heel so as to form the eye of the honda. Although prior releasable hondas have been used with some success, they tend to rotate and/or move lengthwise with respect to the rope when being swung and thrown. This can cause the loop in the lariat to lose its desired formation, and can disturb the balanced feel of the lariat to the roper. A releasable honda should most desirably provide the same performance and feel as a tied honda. Rotation of the releasable honda on the rope can also result in an improper orientation of the arms with respect to the rope and its loop, thereby causing one of the resilient arms to bend excessively as compared to the other arm upon release of the honda. consequently, the likelihood of breakage is increased.

SUMMARY OF THE INVENTION

It is, therefore, an object of the invention to provide a releasable honda for a lariat that will reliably and securely stay in its desired position on the rope of the lariat.

The above object is realized by a releasable honda for a lariat comprising: a heel which includes a proximal end, a distal end, and a throat having a longitudinal axis and extending along such axis between the proximal end and distal end, wherein the throat has at least a portion thereof adjacent to the proximal end that peripherally varies in radius so as to have at least three equiangularly spaced maximum radii and a corresponding number of equiangularly spaced minimum radii between the maximum radii, such maximum and minimum radii being substantially constant along the length of said portion of the throat; and a pair of resilient arms having respective distal ends and extending from the proximal end of the heel on opposite sides of said longitudinal axis to such distal ends, which are closely adjacent to or contacting one another so that the arms form an eye; whereby a lariat incorporating the releasable honda includes a rope having a knotted end seated in said portion of the throat and extending through the throat and then through said eye so as to form a loop.

As used herein, a "radius" of the throat at any peripheral point thereof is the line segment extending between the center of the throat and such peripheral point as well as the associated length of the line segment.

In accordance with the invention, the knotted end of the rope is securely seated in the throat so as to prevent undesirable movement of the honda with respect to the rope. The advantages of such a feature, as should be apparent from the above discussion, include a resultant stable formation of the lariat loop, a balanced feel to the roper, and minimization of arm breakage. The rope has multiple strands, typically three, which are unraveled at one end to tie the knot (such as the popular "rosebud" knot) so as to have the same number of equiangularly spaced extremities corresponding to the maximum radii. Other preferred features of the invention and associated advantages are discussed in the following detailed description of a preferred embodiment characterized by three maximum radii and three minimum radii.

DESCRIPTION OF PREFERRED EMBODIMENT

Figure 1:
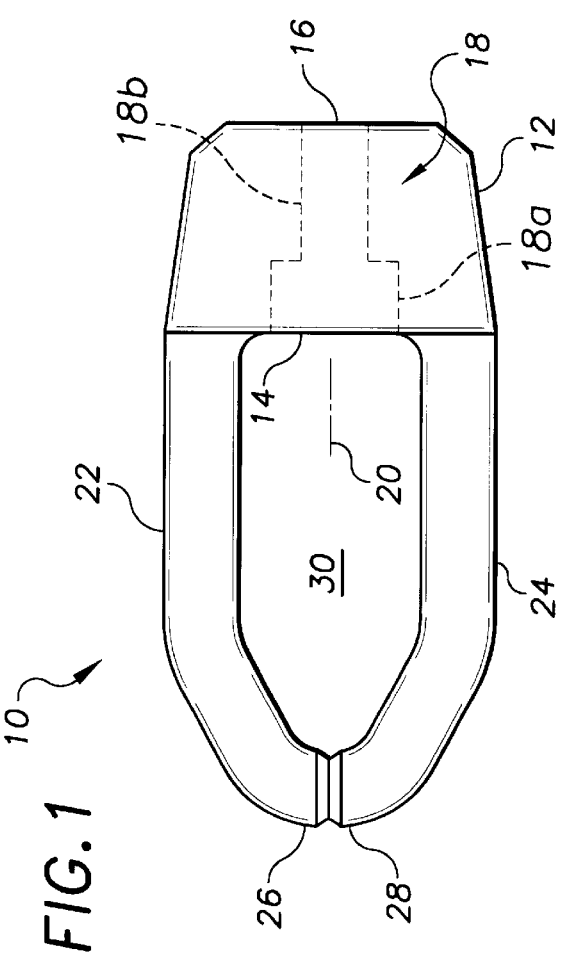
FIG. 1 is a plan view of a releasable honda in accordance with a preferred embodiment of the invention.

Referring to FIG. 1, releasable honda 10 includes a heel 12 which has a proximal end 14, a distal end 16, and a throat 18 having a longitudinal axis 20 and extending along such axis between proximal end 14 and distal end 16. Throat 18, as indicated by broken lines, comprises throat portions 18a and 18b. Throat portion 18a extends from proximal end 14 to throat portion 18b, and throat portion 18b extends to distal end 16. Throat portion 18a is preferably shorter in length than throat portion 18b. The radii (described hereafter in detail) of throat portion 18a are substantially constant along the length of throat portion 18a, and the radius of throat portion 18b is substantially constant along the length of throat portion 18b.

Releasable honda 10 further includes a pair of resilient arms 22 and 24 having respective distal ends 26 and 28. Arms 22 and 24 extend from proximal end 14, on opposite sides of longitudinal axis 20, to distal ends 26 and 28. Portions of arms 22 and 24 adjacent to distal ends 26 and 28 curve inward so that such distal ends are closely adjacent to or contacting one another consequently, arms 22 and 24 form an eye 30.

Figure 2:
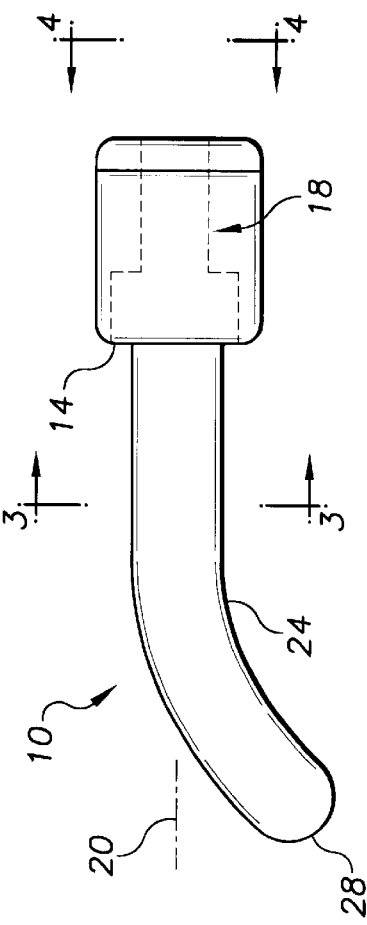
FIG. 2 is a side view of the releasable honda of FIG. 1.

Referring to FIG. 2, this side view of releasable honda 10 shows arm 24 as having a portion adjacent to proximal end 14 which is straight and substantially parallel to longitudinal axis 20 for optimum strength. The remaining portion of arm 24 curves away from longitudinal axis 20 to distal end 28. This simulates the shape of a tied honda of course, although not visible in FIG. 2, arm 22 is identical to arm 24. FIG. 2 also shows throat 18 in broken lines.

Figure 3:
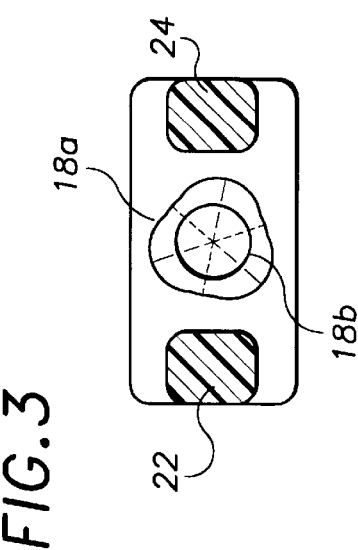
FIG. 3 is a view of the releasable honda as viewed along line 3—3 in FIG. 2.

Referring to FIG. 3, this view shows arms 22 and 24 in cross section. The cross-sectional shape of each arm is preferably polygonal with rounded corners, and most preferably oblong as shown (as opposed to the conventional round shape) to maximize cross-sectional area and thus optimize strength.

FIG. 3 further shows the open end of throat portion 18a and its unique shape. Throat portion 18a peripherally varies in radius (as that term was previously defined) so as to have three equiangularly spaced maximum radii and three equiangularly spaced minimum radii between the maximum radii. The maximum and minimum radii are represented in FIG. 3 by broken lines. The broken lines representing the minimum radii are composed of shorter dashes than the broken lines representing the maximum radii. In the illustrated embodiment, the maximum radii are defined by circular arcs having centers offset from the center of throat portion 18a, and the minimum radii are defined by very small arcs of a circle having a center corresponding to the center of throat portion 18a. FIG. 3 also shows throat portion 18b as being circular in shape, coaxial with throat portion 18a, and having a radius smaller than the minimum radii of throat portion 18a.

Figure 4:
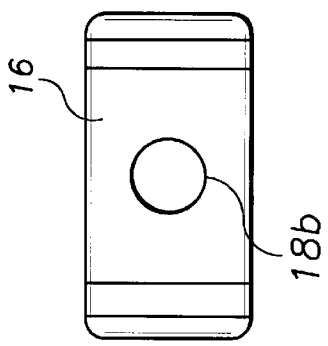
FIG. 4 is a view of the releasable honda as viewed along line 4—4 in FIG. 2.

Referring to FIG. 4, this view shows distal end 16 of the heel and the circular open end of throat portion 18b.

Some preferred dimensions for releasable honda 10 will now be given for the sake of illustration only, but should not be construed to limit the invention in any manner: total length—3.9 inches; length of heel 12—1.2 inches; length of arms (as measured linearly between proximal end 14 of the heel and the distal ends of the arms)—2.7 inches; maximum width—1.8 inches; oblong cross-sectional dimensions of each arm—0.5×0.4 inch; maximum radii of throat 18a—3/8 inch; minimum radii of throat 18a—5/16 inch; and radius of throat portion 18b—7/32 inch. The dimensions for the throat are for use with a rope having a diameter of 9.5–11 mm.

Releasable honda 10 is preferably molded and integrally formed as a single piece from a strong resilient plastic. Nylatron plastic material is presently preferred. Nylatron is a registered trademark of the Polymer corporation. In addition to being very strong and resilient, this material is relatively unaffected by drastic temperature changes, and has excellent "memory" qualities in its capability to bend and return to its original shape repeatedly.

Figure 5:
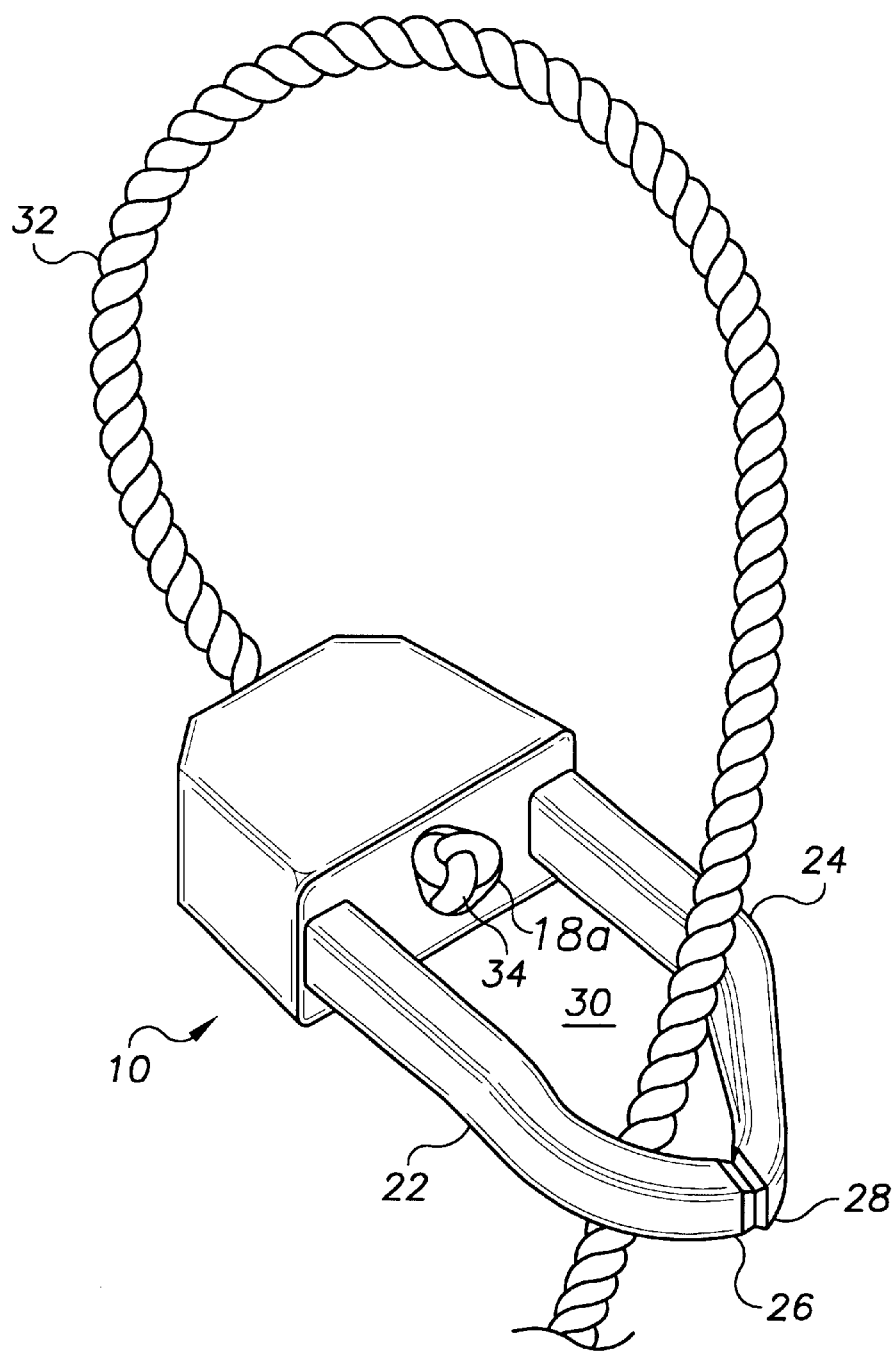
FIG. 5 is a perspective view of a lariat which employs the releasable honda.

Referring to FIG. 5, this perspective view shows a lariat incorporating releasable honda 10. A rope 32 has a knotted end 34 securely seated in throat portion 18a. Knotted end 34 is formed from the three strands of rope 32, and can be in the form of the popular rosebud knot or other suitable knot having three extremities. The three extremities of the knot fit snugly against those peripheral surfaces of throat portion 18a which define the three maximum radii. Accordingly, rotation or longitudinal movement of honda 10 with respect to rope 32 is substantially prevented. This is highly advantageous for reasons previously discussed. From knotted end 34, rope 32 extends through throat portion 18b (see prior Figures) and then through eye 30 so as to form a loop.

In use, the lariat of FIG. 5 would be swung and thrown in the conventional manner to rope an animal, such that the loop goes over the animal's head and is tightened around its neck of course, the loop would be considerably larger than that shown in FIG. 5. In response to a strong pull by the animal and/or roper, a portion of rope 32 would press against distal ends 26 and 28 of arms 22 and 24 to thereby bend the arms outwardly and permit such portion of the rope to pass between the distal ends and out of eye 30. Honda 10 is accordingly released, and the roper can press rope 32 between distal ends 26 and 28 back into eye 30 to reform the loop for another throw.

Obviously, many modifications and variations of the present invention are possible in light of the above teachings. For example, throat portion 18a could have more than three maximum and minimum radii to accommodate a knot having a corresponding number of extremities. It is, therefore, to be understood that within the scope of the appended claims, the invention can be practiced otherwise than as specifically described.

That which is claimed is:

1. A releasable honda for a lariat comprising:
   a heel which includes a proximal end, a distal end, and a throat having a longitudinal axis and extending along such axis between the proximal end and distal end, wherein the throat has a first throat portion and a second throat portion, the first throat portion extending from the proximal end of the heel to the second throat portion and the second throat portion extending to the distal end of the heel, and wherein the first throat portion peripherally varies in radius so as to have at least three equiangularly spaced maximum radii and a corresponding number of equiangularly spaced minimum radii between the maximum radii, such maximum and minimum radii being substantially constant along the length of the first throat portion; and
   a pair of resilient arms having respective distal ends and extending from the proximal end of the heel on opposite sides of said longitudinal axis to such distal ends, which are closely adjacent to or contacting one another so that the arms form an eye;
   whereby a lariat incorporating the releasable honda includes a rope having a knotted end seated in the first throat portion and extending through the second throat portion and then through said eye so as to form a loop.

2. A releasable honda as recited in claim 1 wherein the first throat portion has a center, and wherein the maximum radii are defined by circular arcs having centers offset from the center of the first throat portion.

3. A releasable honda as recited in claim 2 wherein the minimum radii are defined by circular arcs having a center corresponding to the center of the first throat portion.

4. A releasable honda as recited in claim 3 wherein there are three maximum radii and three minimum radii.

5. A releasable honda as recited in claim 4 wherein the second throat portion is circular in shape.

6. A releasable honda as recited in claim 5 wherein the second throat portion is coaxial with the first throat portion and has a radius smaller than the minimum radii of the first throat portion.

7. A releasable honda as recited in claim 6 wherein the radius of the second throat portion is substantially constant along the length of the second throat portion.

8. A releasable honda as recited in claim 7 wherein the first throat portion is shorter in length than the second throat portion.

9. A releasable honda as recited in claim 1 wherein each arm has a first portion adjacent to the proximal end of the heel which is straight and substantially parallel to said longitudinal axis.

10. A releasable honda as recited in claim 9 wherein each arm further has a second portion extending from the first portion of the arm so as to curve away from said longitudinal axis to the distal end of the arm.

11. A releasable honda as recited in claim 10 wherein each arm curves inward adjacent to its distal end.

12. A releasable honda as recited in claim 11 wherein the cross-sectional shape of each arm is polygonal with rounded corners.

13. A releasable honda as recited in claim 12 wherein each arm is also oblong in cross-sectional shape.

14. A releasable honda as recited in claim 1, wherein said releasable honda is integrally formed as a single piece.

15. A releasable honda as recited in claim 14, wherein said releasable honda is comprised of a resilient plastic.

16. A releasable honda for a lariat comprising:

a heel which includes a proximal end, a distal end, and a throat having a longitudinal axis and extending along such axis between the proximal end and distal end, wherein the throat has at least a portion thereof adjacent to the proximal end that peripherally varies in radius so as to have a plurality of maximum and minimum radii consisting of three equiangularly spaced maximum radii and three equiangularly spaced minimum radii between the maximum radii, such maximum and minimum radii being substantially constant along the length of said portion of the throat; and a pair of resilient arms having respective distal ends and extending from the proximal end of the heel on opposite sides of said longitudinal axis to such distal ends, which are closely adjacent to or contacting one another so that the arms form an eye;

whereby a lariat incorporating the releasable honda includes a rope having a knotted end seated in said portion of the throat and extending through the throat and then through said eye so as to form a loop.

17. A releasable honda as recited in claim 16 wherein said portion of the throat is denoted as the first throat portion, and wherein the throat also has a second throat portion, the first throat portion extending from the proximal end of the heel to the second throat portion, and the second throat portion extending to the distal end of the heel.

18. A releasable honda for a lariat comprising:

a heel which includes a proximal end, a distal end, and a throat having a longitudinal axis and extending along such axis between the proximal end and distal end, wherein the throat has at least a portion thereof adjacent to the proximal end that peripherally varies in radius so as to have at least three equiangularly spaced maximum radii and a corresponding number of equiangularly spaced minimum radii between the maximum radii, such maximum and minimum radii being substantially constant along the length of said portion of the throat, and wherein said portion of the throat has a peripheral surface defining an interior therein and having portions thereof that define the minimum radii without projecting inwardly; and a pair of resilient arms having respective distal ends and extending from the proximal end of the heel on opposite sides of said longitudinal axis to such distal ends, which are closely adjacent to or contacting one another so that the arms form an eye;

whereby a lariat incorporating the releasable honda includes a rope having a knotted end seated in said portion of the throat and extending through the throat and then through said eye so as to form a loop.

19. A releasable honda as recited in claim 18 wherein said portion of the throat is denoted as the first throat portion, and wherein the throat also has a second throat portion, the first throat portion extending from the proximal end of the heel to the second throat portion, and the second throat portion extending to the distal end of the heel.

* * * * *